US009777863B2

(12) United States Patent  
Higashidozono et al.

(10) Patent No.: US 9,777,863 B2  
(45) Date of Patent: Oct. 3, 2017

(54) CAPACITY CONTROL VALVE

(71) Applicant: EAGLE INDUSTRY CO., LTD., Tokyo (JP)

(72) Inventors: Hideki Higashidozono, Tokyo (JP); Keigo Shirafuji, Tokyo (JP); Toshinori Kanzaki, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 327 days.

(21) Appl. No.: 14/431,270

(22) PCT Filed: Jan. 29, 2014

(86) PCT No.: PCT/JP2014/051901  
§ 371 (c)(1),  
(2) Date: Mar. 25, 2015

(87) PCT Pub. No.: WO2014/119594  
PCT Pub. Date: Aug. 7, 2014

(65) Prior Publication Data  
US 2015/0345655 A1    Dec. 3, 2015

(30) Foreign Application Priority Data

Jan. 31, 2013  (JP) ................................ 2013-017585

(51) Int. Cl.  
F04B 27/18      (2006.01)  
F16K 31/06      (2006.01)

(52) U.S. Cl.  
CPC ...... *F16K 31/0624* (2013.01); *F04B 27/1804* (2013.01); *F04B 2027/1813* (2013.01);  
(Continued)

(58) Field of Classification Search  
CPC .............. F16K 31/0624; F04B 27/1804; F04B 2027/1854; F04B 2027/1831;  
(Continued)

(56) References Cited

U.S. PATENT DOCUMENTS 6,481,976 B2 * 11/2002 Kimura ............... F04B 27/1804  
                                                               417/222.2  
8,079,827 B2 * 12/2011 Iwa ..................... F04B 27/1804  
                                                               417/222.2

(Continued)

FOREIGN PATENT DOCUMENTS

JP      2001165055      6/2001      .............. F04B 27/14  
WO    WO2006090760    8/2006      .............. F04B 27/18  
(Continued)

OTHER PUBLICATIONS

International Preliminary Report on Patentability issued in application No. PCT/JP2014/051901, dated Aug. 13, 2015 (7 pgs).

(Continued)

*Primary Examiner* — Eric Keasel  
(74) *Attorney, Agent, or Firm* — Hayes Soloway P.C.

(57) ABSTRACT

A control valve for discharging a liquid refrigerant in a control chamber at the time of start-up of a variable capacity compressor has a movable a center post for increasing the area of a passage for discharging the liquid refrigerant when discharging the liquid refrigerant.

20 Claims, 9 Drawing Sheets

(52) U.S. Cl.
CPC .............. *F04B 2027/1827* (2013.01); *F04B 2027/1831* (2013.01); *F04B 2027/1845* (2013.01); *F04B 2027/1854* (2013.01); *Y10T 137/86485* (2015.04)

(58) Field of Classification Search
CPC ...... F04B 2027/1813; F04B 2027/1827; F04B 2027/1845
USPC ..................................................... 417/222.2
See application file for complete search history.

(56) References Cited

U.S. PATENT DOCUMENTS

| | | | |
|---|---|---|---|
| 8,651,826 B2 * | 2/2014 | Futakuchi | F04B 27/1804 417/222.2 |
| 9,132,714 B2 * | 9/2015 | Futakuchi | F04B 27/1804 |
| 2001/0003573 A1 | 6/2001 | Kimura et al. | 417/222.2 |
| 2008/0138213 A1 | 6/2008 | Umemura et al. | 417/222.2 |
| 2012/0198992 A1 | 8/2012 | Futakuchi et al. | 91/505 |
| 2013/0291963 A1 | 11/2013 | Futakuchi et al. | 137/487.5 |

FOREIGN PATENT DOCUMENTS

| | | | |
|---|---|---|---|
| WO | WO2007119380 | 10/2007 | .............. F04B 27/14 |
| WO | WO2011114841 | 9/2011 | .............. F04B 27/14 |
| WO | WO2012077439 | 6/2012 | .............. F04B 27/14 |

OTHER PUBLICATIONS

International Search Report issued in application No. PCT/JP2014/051901, dated Apr. 18, 2014 (4 pgs).

* cited by examiner

Prior Art

CAPACITY CONTROL VALVE

TECHNICAL FIELD

The present invention relates to a capacity control valve for variably controlling a capacity or pressure of a working fluid, and particularly relates to a capacity control valve for controlling a discharge rate of a variable capacity compressor or the like used in an air conditioning system of an automobile or the like according to a pressure load.

BACKGROUND ART

A swash plate type variable capacity compressor used in an air-conditioning system of an automobile or the like includes a rotating shaft rotatably driven by a rotational force of an engine, a swash plate coupled to the rotating shaft so that the angle of inclination can be varied, a piston for compression coupled to the swash plate, and the like, and varies a stroke of the piston by varying the angle of inclination of the swash plate and controls the discharge rate of a refrigerant gas.

The angle of inclination of the swash plate can be continuously varied by adjusting the state of balance of the pressure acting on both faces of the piston through appropriate control of a pressure in a control chamber (crank chamber) using a capacity control valve driven to be opened and closed by an electromagnetic force while using a suction chamber pressure of a suction chamber suctioning a refrigerant gas, a discharge chamber pressure of a discharge chamber discharging the refrigerant gas pressurized by the piston, and a control chamber pressure of the control chamber accommodating the swash plate.

As this type of capacity control valve, as shown in FIG. 9, such a valve is known that includes a body 70 formed of a metal material or a resin material, discharge-side passages 73, 77 formed in the body 70 and providing communication between a discharge chamber and a control chamber, a first valve chamber formed in the middle of the discharge-side passages, suction-side passages 71, 72, 74 providing communication between a suction chamber and the control chamber, a second valve chamber (operation chamber) 83 formed in the middle of the suction-side passages, a valving element 81 formed so that a first valve portion 76 disposed in the first valve chamber 82 and opening and closing the discharge-side passages 73, 77 and a second valve portion 75 disposed in the second valve chamber 83 and opening and closing the suction-side passages 71, 72, 74 are integrally reciprocated and at the same time, perform opening and closing operation in the opposite direction to each other, a third valve chamber 84 formed nearer to the control chamber in the middle of the suction-side passages 71, 72, 74, a pressure sensitive body (bellows) 78 disposed in the third valve chamber and exerting an urging force in a direction of extension (expansion), and contracting in accordance with pressure increase of the surroundings, a valve seat body 80 provided on a free end in the extension and contraction direction of the pressure sensitive body and having an annular seat face, a third valve portion 79 capable of moving integrally with the valving element 81 in the third valve chamber 84, and opening and closing the suction-side passages by engagement and disengagement of the valve seat body 80, a solenoid S connected to the body 70 and exerting an electromagnetic driving force on the valving element 81, and the like (Hereinafter, referred to as a "conventional art". For example, see Patent Citations 1 and 2).

Then, in this capacity control valve V, even though a clutch mechanism is not provided in the variable capacity compressor at capacity control, the pressure in the control chamber (control chamber pressure) Pc can be adjusted by providing communication between the discharge chamber and the control chamber if the control chamber pressure needs to be changed. In addition, if the control chamber pressure Pc rises in the stop state of the variable capacity compressor, the third valve portion (valve opening joint portion) 79 is disengaged from the valve seat body (engagement portion) 80 and opens the suction-side passages, thereby providing communication between the suction chamber and the control chamber.

By the way, if the swash plate type variable capacity compressor is stopped and caused to be started after being left for a long time, the liquid refrigerant (the cooled and liquefied refrigerant gas during leaving) accumulates in the control chamber (crank chamber), so that the discharge rate as setting cannot be secured by compressing the refrigerant gas unless discharging the liquid refrigerant.

To perform a desired capacity control from immediately after the start-up, the liquid refrigerant in the control chamber (crank chamber) needs to be discharged as rapidly as possible.

In the capacity control valve 70 of the conventional art, if the variable capacity compressor is left in the stop state for a long time in a state that the solenoid S is firstly turned off and the second valve portion 75 closes the suction-side passages 71, 72, 74, the liquid refrigerant accumulates in the control chamber (crank chamber) of the variable capacity compressor. If the stopping time of the variable capacity compressor is long, the internal pressure of the variable capacity compressor becomes uniform, and the control chamber pressure Pc is much higher than the control chamber pressure Pc and the suction chamber pressure Ps when driving the variable capacity compressor.

In this state, when the solenoid S is turned on and the valving element 81 begins to start, the first valve portion 76 is moved to the valve-opening direction and at the same time, the second valve portion 75 is moved to the valve-opening direction, and then the second valve portion 75 is opened. At that time, when the control chamber pressure Pc contracts the pressure sensitive body 78, the third valve portion 79 is disengaged from the valve seat body 80 and the third valve portion 79 is opened, and then the liquid refrigerant in the control chamber is discharged from the suction-side passages 71, 72, 74 into the suction chamber of the variable capacity compressor. Then, when the control chamber pressure Pc drops below a predetermined level, the pressure sensitive body 78 elastically returns and extends, and the third valve portion 79 is engaged with the valve seat body 80 and closed so as to close the suction-side passages 71, 72, 74.

In addition, the solenoid S of the conventional art includes a solenoid body 61 coupled to the body 70, a casing 62 surrounding the entirety, a sleeve 63 whose one end is closed, a cylindrical center post (fixed iron core) 64 disposed inside the solenoid body 61 and the sleeve 63, a driving rod 65 capable of reciprocating inside the center post 64 and having its tip end coupled to the valving element 81 so as to form the suction-side passages 71, 72, 74, a plunger (movable iron core) 66 fixed to the other end of the driving rod 65, a coil spring 67 for urging the plunger 66 in a direction to open the first valve portion 76, a coil 68 for excitation wound outside the sleeve 63 through a bobbin, and the like.

In the above configuration, when the coil 68 is not energized, the valving element 81 is moved to the upper side in FIG. 9 by the urging force of the pressure sensitive body 78 and the coil spring 67, the first valve portion 76 is separated from the seat face 77 to open the discharge-side passages 73, 77 and at the same time, the second valve portion 75 is seated on a seat face 83a to close the suction-side passages 71, 72, 74. At this time, when the control chamber pressure Pc rises above the predetermined level, the pressure sensitive body 78 is contracted to retreat and disengage the valve seat body 80 from the third valve portion 79.

On the other hand, when the coil 68 is energized to a predetermined current value (I) or more, by the electromagnetic driving force (urging force) of the solenoid S acting in a direction opposite to the urging force of the pressure sensitive body 78 and the coil spring 67, the valving element 81 is moved to the lower side in FIG. 9, the first valve portion 76 is seated on the seat face 77 to close the discharge-side passages 73, 77 and at the same time, the second valve portion 75 is separated from the seat face 83a to open the portion of the second valve portion 75 in the suction-side passages 71, 72, 74. Immediately after this start-up, when the control chamber pressure Pc is above the predetermined level, the valve seat body 80 is disengaged from the third valve portion 79 to open the suction-side passages 71, 72, 74. For the period from this state till when the third valve portion 79 is seated on the valve seat body 80, the liquid refrigerant or the like accumulating in the control chamber 12 is discharged into the suction chamber 13 via the suction-side passages 71, 72, 74.

However, in the conventional art, since the center post (fixed iron core) 64 is fixed to the solenoid body 61, a second liquid refrigerant discharge valve is limited at a maximum to a passage area formed between the second liquid refrigerant discharge valve, which is at the maximum lowered position of the second liquid refrigerant discharge valve determined by the stroke of the plunger 66, and the seat face 83a, so that there was a limit on the discharge rate of the liquid refrigerant per unit time.

CITATION LIST

Patent Literature

Patent Citation 1: PCT International Publication No. WO 2006/090760

Patent Citation 2: PCT International Publication No. WO 2007/119380

SUMMARY OF INVENTION

Technical Problem

The present invention was devised in order to solve the problems with the above-described conventional art, and an object thereof is to provide a capacity control valve in which a function for discharging a liquid refrigerant in a control chamber at the time of start-up of a variable capacity compressor is significantly improved by moving a center post and increasing the area of a passage for discharging the liquid refrigerant when discharging the liquid refrigerant.

Solution to Problem

[Principle]

Firstly, the present invention is characterized in that a center post which was fixed in a conventional art is made movable and the area of a passage for discharging a liquid refrigerant can be increased compared to a capacity control valve of the conventional art by moving the center post when discharging the liquid refrigerant.

Secondly, the present invention is characterized in that a dedicated bypass passage for discharging the liquid refrigerant is provided and the area of the passage for discharging the liquid refrigerant is further increased by opening the bypass passage by means of the center post only when discharging the liquid refrigerant.

[Solution]

In a first aspect, a capacity control valve of the present invention is characterized by including:

discharge-side passages for providing communication between a discharge chamber for discharging a fluid and a control chamber for controlling a discharge rate of the fluid;

a first valve chamber formed in the middle of the discharge-side passages;

a valving element integrally having a first valve portion for opening and closing the discharge-side passages in the first valve chamber;

suction-side passages for providing communication between a suction chamber for sucking the fluid and the control chamber;

a second valve chamber and a third valve chamber formed in the middle of the suction-side passages;

a suction-side passage opening/closing means provided in the middle of the suction-side passages; and a solenoid for exerting an electromagnetic driving force for controlling the valving element, and in which the suction-side passage opening/closing means has a third valve portion for opening and closing the suction-side passages by receiving the pressure of the control chamber in the third valve chamber, and a second valve portion for opening and closing the suction-side passages by receiving the electromagnetic driving force in the second valve chamber, and a center post which is a constituent member of the solenoid is provided movably in the axial direction in such a manner that one end face thereof is opposed to the second valve portion, and the center post is driven to the direction away from the second valve portion and controlled so that the distance between the second valve portion is increased when discharging a liquid refrigerant.

According to the first aspect, when discharging the liquid refrigerant, since the center post is moved to the direction away from the second valve portion, the passage area of the second valve chamber is dramatically increased compared to the case where the center post is fixed, and the amount of the refrigerant discharged into the suction chamber via the suction-side passages out of the liquid refrigerant or the like accumulating in the control chamber can be dramatically increased.

In addition, in a second aspect, the capacity control valve according to the first aspect of the present invention is characterized in that the end face opposed to the second valve portion of the center post functions as a valve seat face of the second valve portion.

According to the second aspect, the area of the passage for discharging the liquid refrigerant in the second valve chamber can be adjusted using an existing member without providing a special member.

In addition, in a third aspect, the capacity control valve according to the first or second aspect of the present invention is characterized in that the end face opposed to the second valve portion of the center post is formed in a tapered shape.

According to the third aspect, sealing at the time of closure of the second valve portion can be ensured.

In addition, in a fourth aspect, the capacity control valve according to any of the first to third aspects of the present invention is characterized in that the solenoid is provided with an elastic member for urging the center post to the second valve portion side, and the urging force of the elastic member is set smaller than the electromagnetic driving force to the center post when discharging the liquid refrigerant and larger than the electromagnetic driving force to the center post when performing continuous variable control.

According to the fourth aspect, the center post can be driven to the direction away from the second valve portion by the electromagnetic driving force when discharging the liquid refrigerant, and the center post can be returned to the original position by the urging force of the elastic member when performing continuous control and when performing OFF-operation control, so that the center post can be controlled with a simple configuration.

In addition, in a fifth aspect, the capacity control valve according to any of the first to fourth aspects of the present invention is characterized in that the suction-side passage is composed of an internal passage passing through the inside of the third valve portion, first valve portion, and second valve portion.

According to the fifth aspect, the suction-side passage is composed of the internal passage, so that the diameter of a valve body can be reduced.

In addition, in a sixth aspect, the capacity control valve according to the fifth aspect of the present invention is characterized in that a bypass passage for providing direct communication between the third valve chamber and the second valve chamber is provided in the valve body in addition to the internal passage, and the bypass passage is configured so as to be opened in accordance with the movement of the center post when discharging the liquid refrigerant.

According to the sixth aspect, when discharging the liquid refrigerant, the area of a passage for discharging the liquid refrigerant between the third valve chamber and the second valve chamber can be dramatically increased when the control chamber pressure Pc is above a predetermined level. In addition, when discharging the liquid refrigerant, the liquid refrigerant or the like accumulating in the control chamber can be discharged into the suction chamber via the bypass passage even when the control chamber pressure Pc is below the predetermined level.

In addition, in a seventh aspect, the capacity control valve according to the sixth aspect of the present invention is characterized in that the end face opposed to the bypass passage of the center post is formed in a flat shape, and an elastic member for sealing is provided on the flat portion.

According to the seventh aspect, sealing at the time of closure of the bypass passage and the end face of the center post can be ensured.

Advantageous Effects of Invention

The present invention exhibits the following superior effects.

(1) According to the first aspect in which the center post which is a constituent member of the solenoid is provided movably in the axial direction in such a manner that one end face thereof is opposed to the second valve portion, and the center post is driven to the direction away from the second valve portion and controlled so that the distance between the second valve portion is increased when discharging the liquid refrigerant, the center post is moved to the direction away from the second valve portion when discharging the liquid refrigerant, so that the passage area of the second valve chamber is dramatically increased compared to the case where the center post is fixed, and the amount of the refrigerant discharged into the suction chamber via the suction-side passages out of the liquid refrigerant or the like accumulating in the control chamber can be dramatically increased.

(2) According to the second aspect in which the end face opposed to the second valve portion of the center post functions as the valve seat face of the second valve portion, the area of the passage for discharging the liquid refrigerant in the second valve chamber can be adjusted using an existing member without providing a special member.

(3) According to the third aspect in which the end face opposed to the second valve portion of the center post is formed in a tapered shape, sealing at the time of closure of the second valve portion can be ensured.

(4) According to the fourth aspect in which the elastic member for urging the center post to the second valve portion side is provided, and the urging force of the elastic member is set smaller than the electromagnetic driving force to the center post when discharging the liquid refrigerant and larger than the electromagnetic driving force to the center post when performing continuous variable control, the center post can be driven to the direction away from the second valve portion by the electromagnetic driving force when discharging the liquid refrigerant, and the center post can be returned to the original position by the urging force of the elastic member when performing continuous control and when performing OFF-operation control, so that the center post can be controlled with a simple configuration.

(5) According to the fifth aspect in which the suction-side passages are composed of the internal passage passing through the inside of the third valve portion, first valve portion, and second valve portion, the suction-side passages are composed of the internal passage, so that the diameter of the valve body can be reduced.

(6) According to the sixth aspect in which the bypass passage for providing direct communication between the third valve chamber and the second valve chamber is provided in the valve body in addition to the internal passage, and the bypass passage is configured so as to be opened in accordance with the movement of the center post when discharging the liquid refrigerant, when discharging the liquid refrigerant, the area of the passage for discharging the liquid refrigerant between the third valve chamber and the second valve chamber can be dramatically increased when the control chamber pressure Pc is above a predetermined level. In addition, when discharging the liquid refrigerant, the liquid refrigerant or the like accumulating in the control chamber can be discharged into the suction chamber 13 via the bypass passage even when the control chamber pressure Pc is below the predetermined level.

(7) According to the seventh aspect in which the end face opposed to the bypass passage of the center post is formed in a flat shape, and the elastic member for sealing is provided on the flat portion, sealing at the time of closure of the bypass passage and the end face of the center post can be ensured.

A schematic configuration diagram showing a swash plate type variable capacity compressor with a capacity control valve according to embodiments of the present invention.

FIG. 2

A front cross-sectional view showing a capacity control valve according to a first embodiment of the present invention, showing a state of discharging a liquid refrigerant.

FIG. 3

A front cross-sectional view showing the capacity control valve according to the first embodiment of the present invention, showing a state of performing continuous control.

FIG. 4

A front cross-sectional view showing the capacity control valve according to the first embodiment of the present invention, showing a state of performing OFF-operation.

FIG. 5

A front cross-sectional view showing a capacity control valve according to a second embodiment of the present invention, showing a first state of discharging the liquid refrigerant.

FIG. 6

A front cross-sectional view showing the capacity control valve according to the second embodiment of the present invention, showing a second state of discharging the liquid refrigerant.

FIG. 7

A front cross-sectional view showing the capacity control valve according to the second embodiment of the present invention, showing a state of performing continuous control.

FIG. 8

A front cross-sectional view showing the capacity control valve according to the second embodiment of the present invention, showing a state of performing OFF-operation.

FIG. 9

A front cross-sectional view showing a capacity control valve of a conventional art.

DESCRIPTION OF EMBODIMENTS

Hereinafter, with reference to the drawings, modes for carrying out the present invention will be described illustratively based on embodiments. However, the dimension, material, shape, relative position and the like of components described in the embodiments are not intended to be limited thereto only, unless explicitly stated otherwise.

First Embodiment

With reference to FIGS. 1 to 4, a capacity control valve according to a first embodiment of the present invention will be described.

[Swash Plate Type Variable Capacity Compressor with a Capacity Control Valve]

Figure 1:
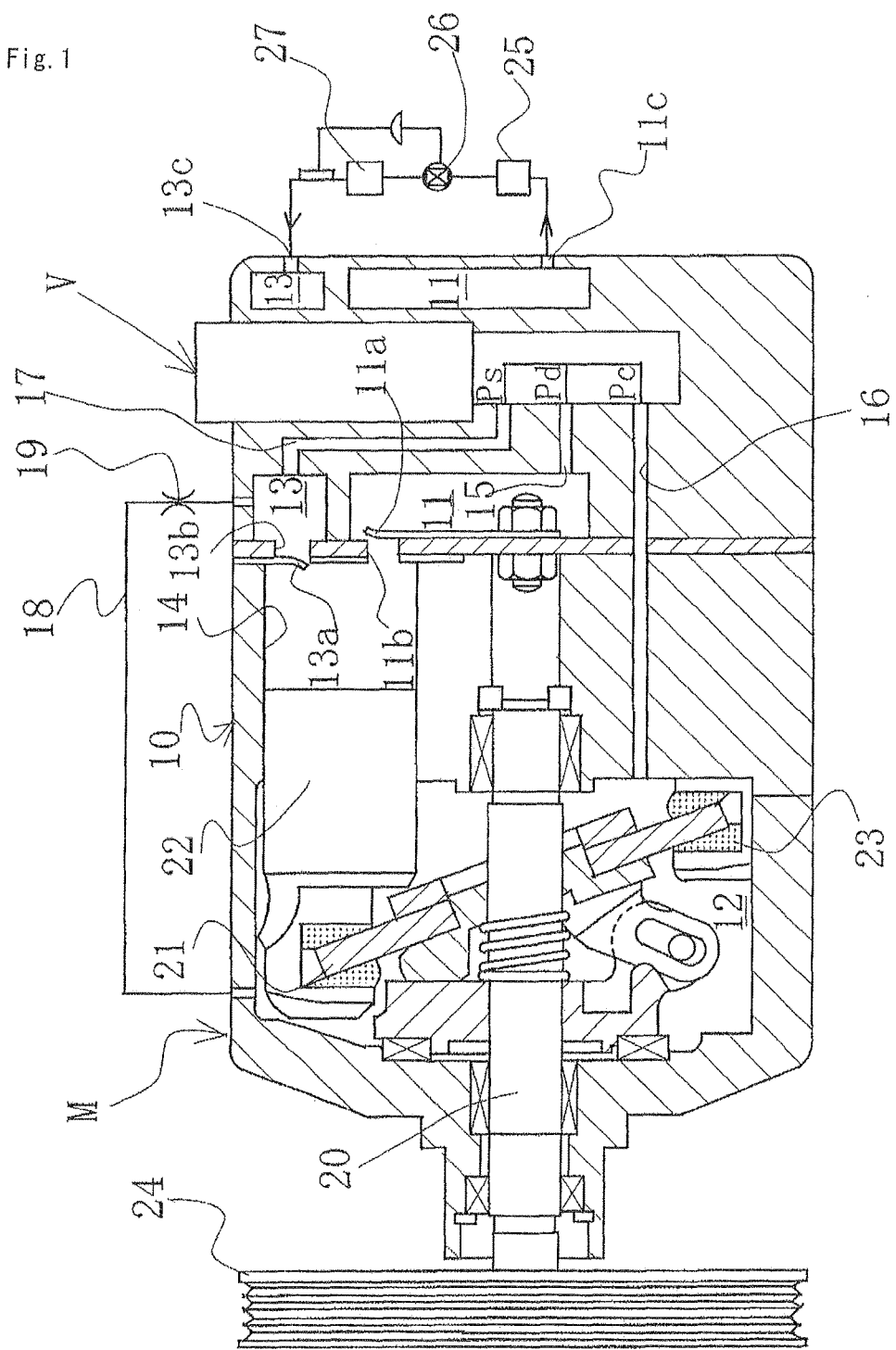
FIG. 1

As shown in FIG. 1, a swash plate type variable capacity compressor M includes a discharge chamber 11, a control chamber (also referred to as a crank chamber) 12, a suction chamber 13, a plurality of cylinders 14, a port 11b opened and closed by a discharge valve 11a for providing communication between the cylinders 14 and the discharge chamber 11, a port 13b opened and closed by a suction valve 13a for providing communication between the cylinders 14 and the suction chamber 13, a discharge port 11c and a suction port 13c connected to an external cooling circuit, communication passages 15, 16 as discharge-side passages for providing communication between the discharge chamber 11 and the control chamber 12, communication passages 16, 17 as suction-side passages for providing communication between the control chamber 12 and the suction chamber 13, a casing 10 defining all the above or the like, a rotating shaft 20 rotatably provided so as to protrude from the inside of the control chamber (crank chamber) 12 to the outside, a swash plate 21 rotated integrally with the rotating shaft 20 and coupled to the rotating shaft 20 so that the angle of inclination can be varied, a plurality of pistons 22 fitted into each of the cylinders 14 so as to be capable of reciprocating, a plurality of coupling members 23 for coupling the swash plate 21 and each of the pistons 22, a driven pulley 24 mounted to the rotating shaft 20, a capacity control valve V of the present invention incorporated into the casing 10, and the like.

In addition, the swash plate type variable capacity compressor M is provided with a communication passage 18 for providing direct communication between the control chamber (crank chamber) 12 and the suction chamber 13, and the communication passage 18 is provided with a fixed orifice 19.

Further, in the swash plate type variable capacity compressor M, the cooling circuit is connected to the discharge port 11c and the suction port 13c, and the cooling circuit is provided with a condenser 25, an expansion valve 26, and an evaporator 27 in a sequential arrangement.

[Capacity Control Valve]

Figure 2:
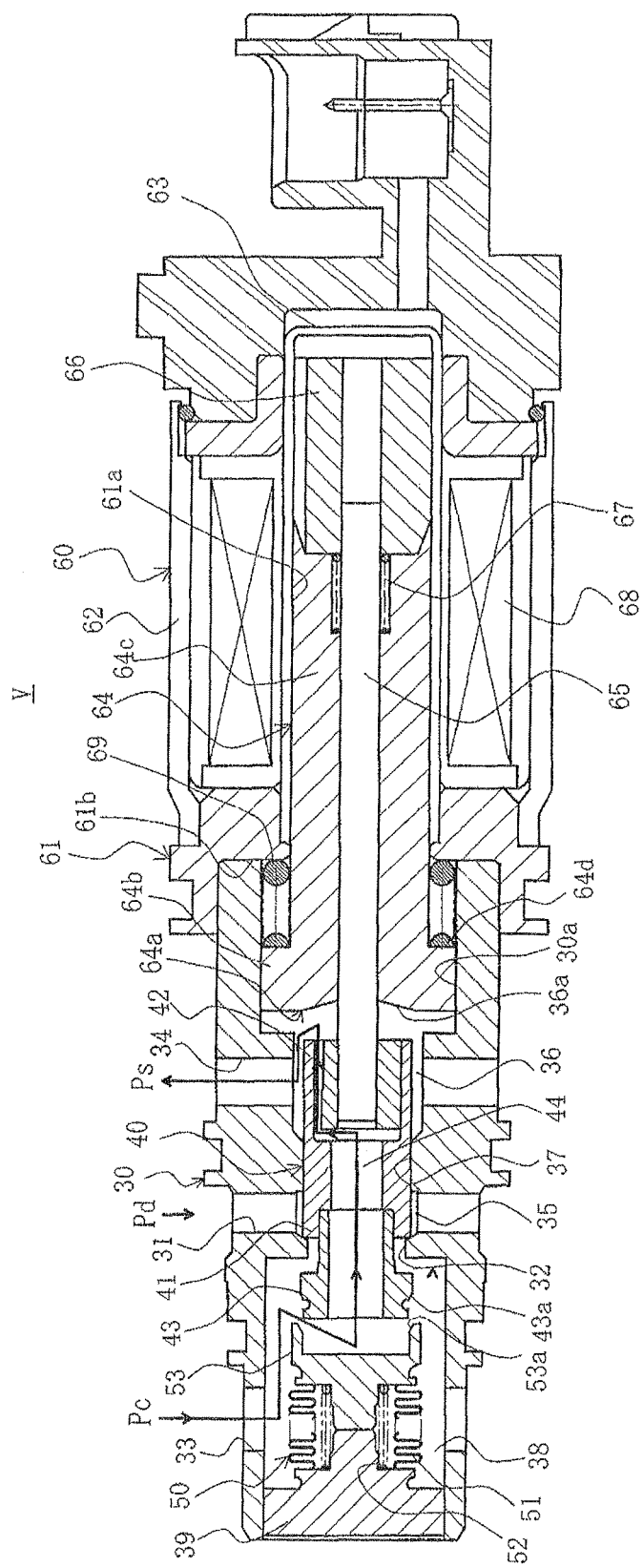

As shown in FIG. 2, the capacity control valve V includes a valve body 30 formed of a metal material or a resin material, a first valve portion 41 disposed in the valve body 30 so as to be capable of reciprocating, a pressure sensitive body 50 for urging the first valve portion 41 in one direction, a solenoid 60 connected to the valve body 30 and exerting an electromagnetic driving force on the first valve portion 41, and the like.

The valve body 30 includes communication passages 31, 32, functioning as discharge-side passages, a first valve chamber 35 formed in the middle of the discharge-side passages, communication passages 33, 34 functioning as suction-side passages together with a communication passage 44 of the first valve portion 41, a second valve chamber 36 formed in the middle of the suction-side passages, a guide passage 37 for guiding the first valve portion 41, a third valve chamber 38 formed nearer to the control chamber 12 of the discharge-side passages and the suction-side passages, and the like. In addition, a closing member 39 that defines the third valve chamber 38 and constitutes a part of the valve body 30 is mounted to the valve body 30 by threaded engagement.

The communication passage 33 and the third valve chamber 38 are formed so as to double as a part of the discharge-side passages and the suction-side passages, and the communication passage 32 forms a valve hole for providing communication between the first valve chamber 35 and the third valve chamber 38 and allowing the first valve portion 41 to be passed through. It should be noted that the communication passages 31, 33, 34 are formed in plural (four with an interval of 90 degrees, for example) being arranged radially in the circumferential direction, respectively.

Then, in the first valve chamber 35, a seat face 35a on which the first valve portion 41 of the valving element 40 described later is seated is formed on an edge portion of the communication passage (valve hole) 32, and in the second valve chamber 36, a seat face 36a on which a second valve portion 42 is seated is formed on one end face 64a of a center post 64 described later.

Here, since the suction-side passage from the control chamber 12 to the third valve chamber 38 and the discharge-side passage from the third valve chamber 38 to the control chamber 12 are formed as the same communication passage 33, the first valve chamber 35, the second valve chamber 36, and the third valve chamber 38 can be easily arranged along the longitudinal direction (reciprocating direction) of the valving element 40, by which integration of the entirety, simplification of the structure and reduction of the size can be achieved.

The valving element 40 is formed into a substantially cylindrical shape, and includes the first valve portion 41 on one end side, the second valve portion 42 on the other end side, a third valve portion 43 coupled by later mounting to the opposite side of the second valve portion 42 across the first valve portion 41, the communication passage 44 passing through in the axial direction from the second valve portion 42 to the third valve portion 43 and functioning as the suction-side passage, and the like.

It should be noted that the communication passage 44 passing through from the second valve portion 42 to the third valve portion 43 and functioning as the suction-side passage may be referred to as an internal passage in the present specification.

The third valve portion 43 is formed into a shape widened toward the end from a reduced diameter state toward the third valve chamber 38 from the first valve chamber 35, is inserted through the communication passage (valve hole) 32, and includes an annular engagement face 43a opposed to a valve seat body 53 described later at its outer circumferential edge.

The pressure sensitive body 50 includes a bellows 51, a coil spring 52 disposed in compression within the bellows 51, a valve seat body 53, and the like. The bellows 51 is fixed at one end thereof to the closing member 39 and holds the valve seat body 53 at the other end (free end) thereof.

The valve seat body 53 includes, at its outer peripheral edge, an annular seat face 53a for engagement and disengagement in an opposed state to the engagement face 43a of the third valve portion 43.

That is, the pressure sensitive body 50 is disposed within the third valve chamber 38 and is operated to exert an urging force in a direction to open the first valve portion 41 by its extension (expansion) and to weaken the urging force exerted on the first valve portion 41 by contraction in accordance with pressure increase of the surroundings (inside the third valve chamber 38 and the communication passage 44 of the valving element 40).

The solenoid 60 includes a solenoid body 61 coupled to the valve body 30, a casing 62 surrounding the entirety, a sleeve whose one end is closed, a cylindrical center post (corresponding to a fixed iron core of the conventional solenoid) 64 disposed inside the solenoid body 61 and the sleeve 63, a driving rod 65 capable of reciprocating inside the center post 64 and having its tip end coupled to the valving element 40 so as to form the communication passage 44, a plunger 66 fixed to the other end side of the driving rod 65, a coil spring 67 for urging the plunger 66 in a direction to open the first valve portion 41, a coil 68 for excitation wound outside the sleeve 63 through a bobbin, and the like.

Figure 3:
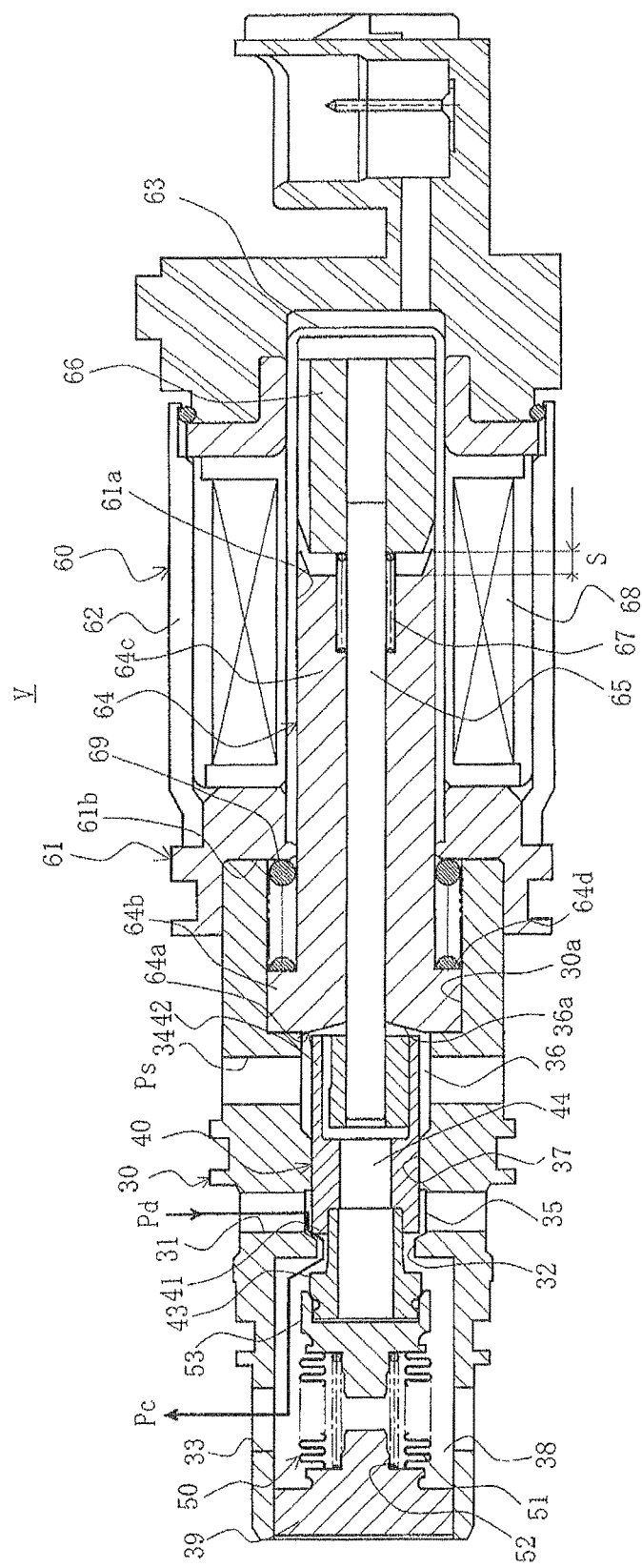
Figure 4:
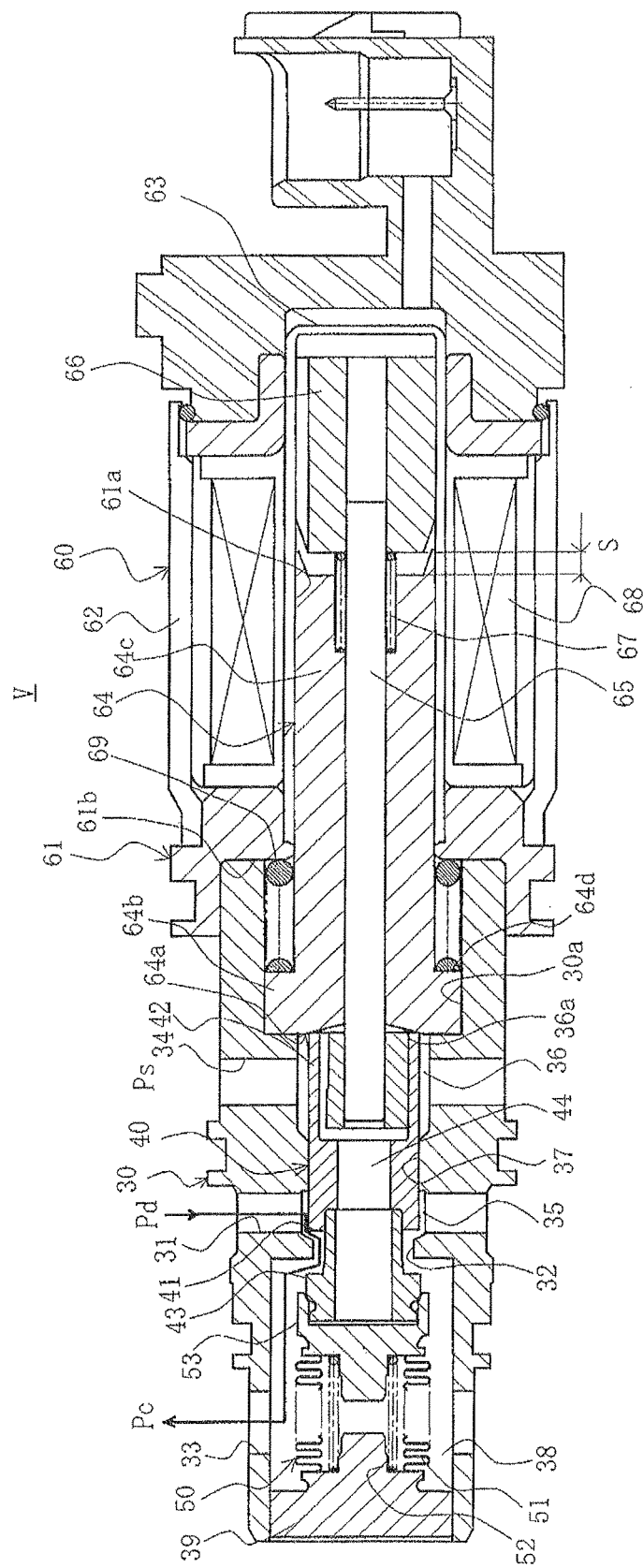

In the solenoid 60 configured as above, the center post 64 is provided in the valve body 30 and the solenoid body 61 so as to be capable of reciprocating in the axial direction. That is, as shown in FIGS. 3 and 4, when performing continuous control and when performing OFF-control, a gap S by a space for movement of the center post 64 is provided between the center post 64 and the plunger 66. On the other hand, an accommodating hole 30a of the valve body 30 for accommodating a flange portion 64b of the center post 64 is formed on the solenoid body 61 side of the valve body 30 so as to be larger in diameter than an accommodating hole 61a of the solenoid body 61 for accommodating a main body part 64c and have a certain length in the axial direction for allowing the flange portion 64b to axially move.

In addition, between a reverse face 64d of the flange portion 64b of the center post 64 and a face 61b of the solenoid body 61 on which the end of the valve body 30 abuts, an elastic member 69 (for example, a coil spring) for urging the center post 64 to the second valve portion 42 side is provided.

It should be noted that the elastic member 69 may be provided between the center post 64 side (a moving side) and the body side (a stationary side) and may be provided between the center post 64 and the valve body 30.

The urging force of the elastic member 69 is set smaller than an electromagnetic driving force F1 to the center post 64 when discharging the liquid refrigerant and larger than an electromagnetic driving force F2 to the center post when performing continuous variable control. Although the ratio between the electromagnetic driving forces F1 and F2 is determined by design, a range of F1/F2=2-5 is preferable.

If the coil 68 is excited, a magnetic flux is generated in the inside of the coil 68, that is, the portion where the center post 64 and the plunger 66 are arranged, and the center post 64 and the plunger 66 are magnetized respectively. Then, different magnetic poles are formed respectively on the opposed end faces of the center post 64 and the plunger 66, so that an attracting force, that is, an electromagnetic driving force to the center post 64 is generated between the center post 64 and the plunger 66.

It is desirable that the seat face 36a on which the second valve portion 42 of the one end face 64a of the center post 64 is seated is formed in a tapered shape in terms of improving the sealing performance.

[Description of a State of Discharging the Liquid Refrigerant]

In the above configuration, as shown in FIG. 4, when the coil 68 is not energized, the valving element 40 is moved to the right side in FIG. 4 by the urging force of the pressure sensitive body 50 and the coil spring 67, the first valve portion 41 is separated from the seat face 35a to open the communication passages (discharge-side passages) 31, 32 and at the same time, the second valve portion 42 is seated on the seat face 36a to close the communication passages (suction-side passages) 34, 44.

If the variable capacity compressor is left in the stop state for a long time in a state that the communication passages (suction-side passages) 34, 44 are closed, the liquid refrigerant accumulates in the control chamber (crank chamber) 12 of the variable capacity compressor, the internal pressure of the variable capacity compressor becomes uniform, and the control chamber pressure Pc is much higher than the control chamber pressure Pc and the suction chamber pressure Ps when driving the variable capacity compressor.

When the coil 68 is energized to a predetermined current value (I) (the current value when performing continuous control or the current value when discharging the liquid refrigerant) or more, by the electromagnetic driving force (urging force) of the solenoid 60 acting in a direction opposite to the urging force of the pressure sensitive body 50 and the coil spring 67, as shown in FIG. 2, the valving element 40 is moved to the left side in FIG. 2, the first valve portion 41 is seated on the seat face 35a to close the communication passages (discharge-side passages) 31, 32 and at the same time, the second valve portion 42 is separated from the seat face 36a to open the communication passages (suction-side passages) 34, 44.

Now, when the coil 68 is energized to the current value at the time of start-up, that is, the current value when discharging the liquid refrigerant, the driving force by the plunger 66 to the center post 64 is larger than the urging force of the elastic member 69, so that the center post 64 is moved to the right side in FIG. 2. By the movement of the center post 64, the passage area of the second valve chamber is dramatically increased compared to the case where the center post 64 is fixed.

Immediately after this start-up, when the control chamber pressure Pc is above the predetermined level, as shown in FIG. 2, the pressure sensitive body 51 is contracted, the valve seat body 53 is disengaged from the third valve portion 43, and the suction-side passages are opened. The liquid refrigerant or the like accumulating in the control chamber 12 is discharged into the suction chamber 13 via the communication passages (suction-side passages) 33, 44, 34 as shown by arrows.

When the control chamber pressure Pc is below the predetermined level, the pressure sensitive body 51 is extended, and the third valve portion 43 is seated on the valve seat body 53.

[Description of a State of Performing Continuous Control]

FIG. 3 shows a state of performing continuous control. If the compressor is in a continuous control state, by means of the solenoid 60, the first valve portion 41 is in a small opening degree state and at the same time, the second valve portion 42 also is in a small opening degree state.

In addition, the center post 64 is in a state of abutting on the left end of the accommodating hole 30a of the valve body 30 by the urging force of the elastic member 69. Since the control chamber pressure Pc is below the predetermined level when performing continuous control, the pressure sensitive body 51 is extended, and the third valve portion 43 is seated on the valve seat body 53, so that the suction-side passages between the control chamber 12 and the suction chamber 13 are blocked.

In this state, a predetermined amount of control fluid flows from the discharge chamber to the control chamber as shown by arrows.

[Description of a State of Performing OFF-Operation]

FIG. 4 shows a state of performing OFF-operation. When the coil 68 is not energized, the valving element 40 is moved to the right side in FIG. 4 by the urging force of the pressure sensitive body 50 and the coil spring 67, the first valve portion 41 is separated from the seat face 35a to open the communication passages (discharge-side passages) 31, 32 and at the same time, the second valve portion 42 is seated on the seat face 36a to close the communication passages (suction-side passages) 34, 44.

In addition, the center post 64 is in a state of abutting on the left end of the accommodating hole 30a of the valve body 30 by the urging force of the elastic member 69. That is, in this state, the communication passages (discharge-side passages) 31, 32 are opened, and the communication passages (suction-side passages) 34, 44 are closed.

In this state, a high-pressure fluid flows from the discharge chamber to the control chamber as shown by arrows.

As discussed above, according to the capacity control valve of the first embodiment, when discharging the liquid refrigerant, since the center post 64 is moved to the direction away from the second valve portion, the passage area of the second valve chamber 36 is dramatically increased compared to the case where the center post 64 is fixed. Therefore, the amount of the refrigerant discharged into the suction chamber 13 via the communication passages (suction-side passages) 44, 34 out of the liquid refrigerant or the like accumulating in the control chamber 12 is dramatically increased. In addition, the center post 64 can be driven to the direction away from the second valve portion 42 by the electromagnetic driving force when discharging the liquid refrigerant, and the center post 64 can be returned to the original position by the urging force of the elastic member 69 when performing continuous control and when performing OFF-operation control, so that the center post 64 can be controlled with a simple configuration.

Second Embodiment

With reference to FIGS. 5 to 8, a capacity control valve according to a second embodiment of the present invention will be described.

It should be noted that the same reference signs are given to the same members as the first embodiment and redundant description thereof will be omitted.

The capacity control valve of the second embodiment shown in FIGS. 5 to 8 is characterized in that a dedicated bypass passage 55 for discharging the liquid refrigerant is provided and the area of the passage for discharging the liquid refrigerant is further increased by opening the bypass passage 55 by means of the operation of the center post 64 only when discharging the liquid refrigerant.

Figure 5:
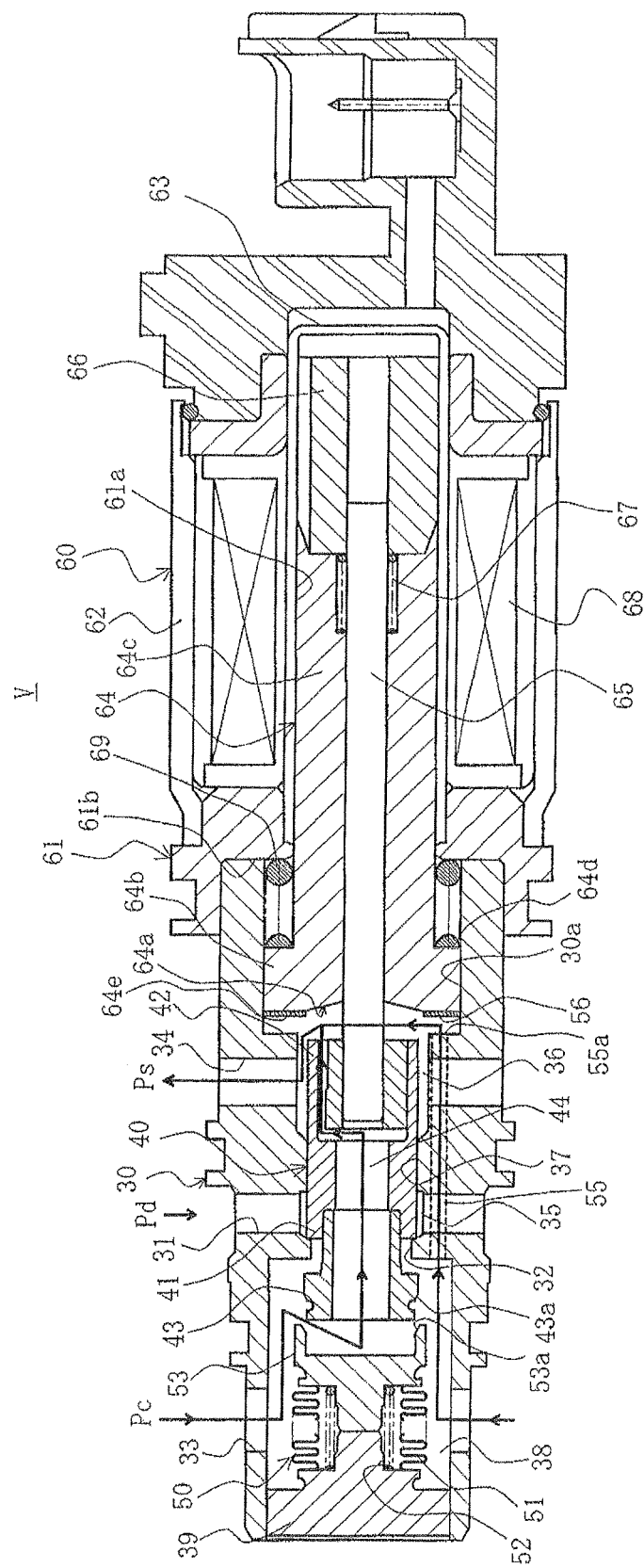

FIG. 5 shows the capacity control valve according to the second embodiment of the present invention in a first state of discharging the liquid refrigerant.

In FIG. 5, the bypass passage 55 for providing direct communication between the third valve chamber 38 and the second valve chamber 36 is provided in the valve body 30 along the axial direction. In FIG. 5, although one bypass passage 55 is shown, a plurality of bypass passages 55 may be arranged circumferentially at equal intervals of 30° to 120°, for example.

It should be noted that at least one bypass passage 55 may be provided.

An open end 55a opening into the second valve chamber 36 comes into contact with and separates from the one end face 64a of the center post 64, thereby opening and closing the bypass passage 55. Therefore, in the one end 64a of the center post 64, an outer diameter-side end face 64e abutting on the open end 55a of the bypass passage 55 is formed in a flat shape. In addition, in order to ensure sealing at the time of abutment, an elastic member 56 for sealing is attached to the flat outer diameter-side end face 64e.

[Description of a State of Discharging the Liquid Refrigerant]

Figure 8:
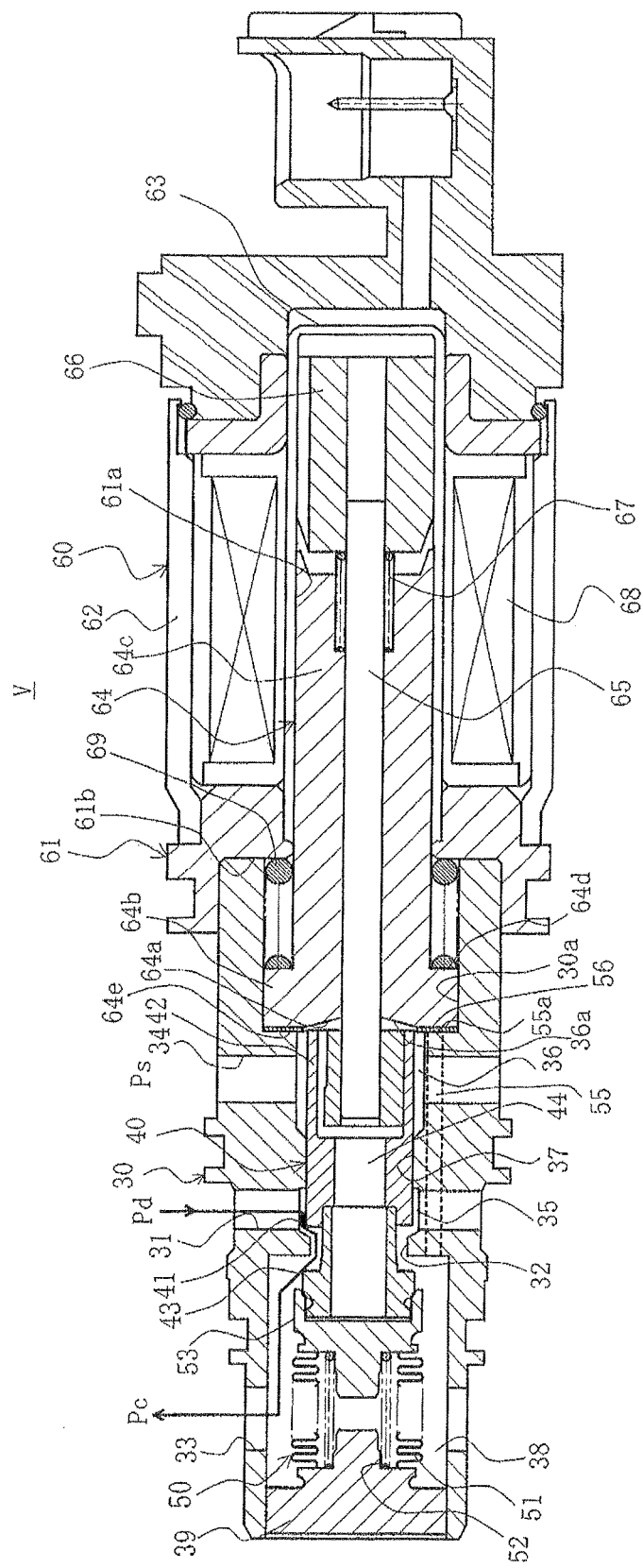
Figure 9:
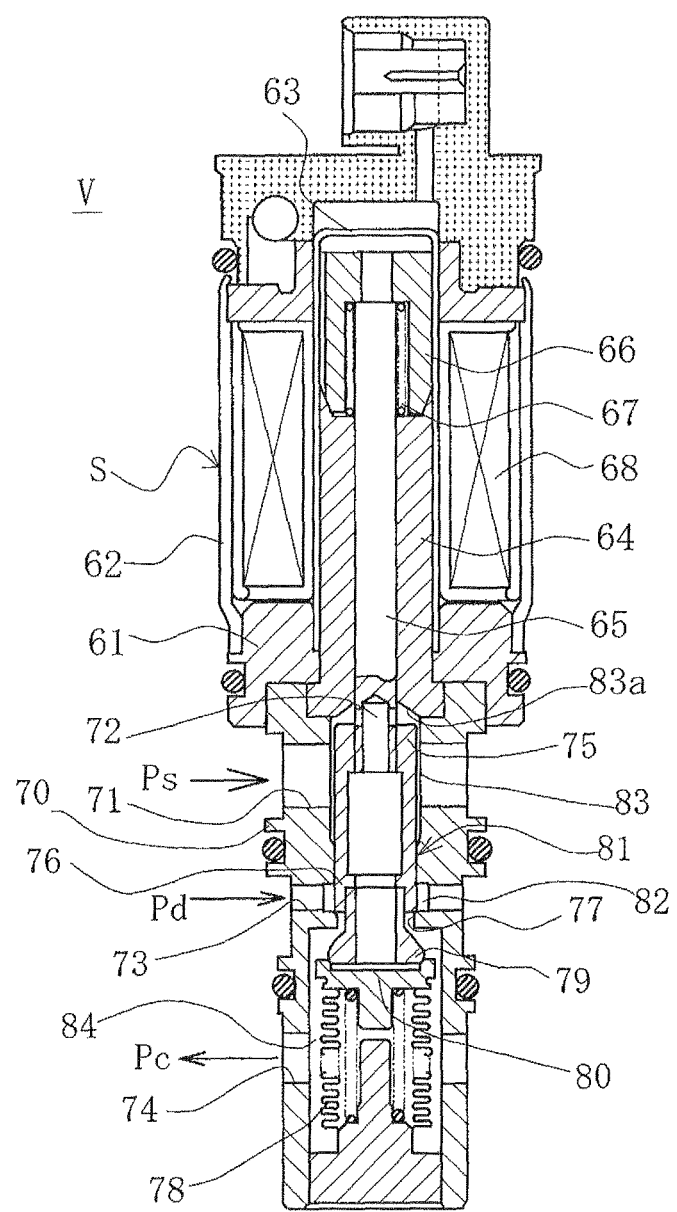

In the above configuration, as shown in FIG. 8, when the coil 68 is not energized, the valving element 40 is moved to the right side in FIG. 8 by the urging force of the pressure sensitive body 50 and the coil spring 67, the first valve portion 41 is separated from the seat face 35a to open the communication passages (discharge-side passages) 31, 32 and at the same time, the second valve portion 42 is seated on the seat face 36a to close the communication passages (suction-side passages) 34, 44.

If the variable capacity compressor is left in the stop state for a long time in a state that the communication passages (suction-side passages) 34, 44 are closed, the liquid refrigerant accumulates in the control chamber (crank chamber) 12 of the variable capacity compressor, the internal pressure of the variable capacity compressor becomes uniform, and the control chamber pressure Pc is much higher than the control chamber pressure Pc and the suction chamber pressure Ps when driving the variable capacity compressor.

When the coil 68 is energized to the predetermined current value (I) (the current value when performing continuous control or the current value when discharging the liquid refrigerant) or more, by the electromagnetic driving force (urging force) of the solenoid 60 acting in a direction opposite to the urging force of the pressure sensitive body 50 and the coil spring 67, as shown in FIG. 5, the valving element 40 is moved to the left side in FIG. 5, the first valve portion 41 is seated on the seat face 35a to close the communication passages (discharge-side passages) 31, 32 and at the same time, the second valve portion 42 is separated from the seat face 36a to open the communication passages (suction-side passages) 34, 44.

At the same time, the driving force by the plunger 66 to the center post 64 is larger than the urging force of the elastic member 69, so that the center post 64 is moved to the right side in FIG. 5. By the movement of the center post 64, the passage area of the second valve chamber is dramatically increased compared to the case where the center post 64 is fixed.

Immediately after this start-up, when the control chamber pressure Pc is above the predetermined level, as shown in FIG. 5, the pressure sensitive body 51 is contracted, the valve seat body 53 is disengaged from the third valve portion 43, and the suction-side passages are opened. In addition, the flat outer diameter-side end face 64e of the center post 64 is separated from the open end 55a of the bypass passage 55, so that the liquid refrigerant or the like accumulating in the control chamber 12 is discharged into the suction chamber 13 via the communication passages (suction-side passages) 44, 34 and the bypass passage 55. In this way, the liquid refrigerant or the like is discharged through the bypass passage 55 in parallel with the suction-side passages, so that the discharge rate is increased.

When the control chamber pressure Pc is below the predetermined level, the pressure sensitive body 51 is extended, and the third valve portion 43 is seated on the valve seat body 53.

Figure 6:
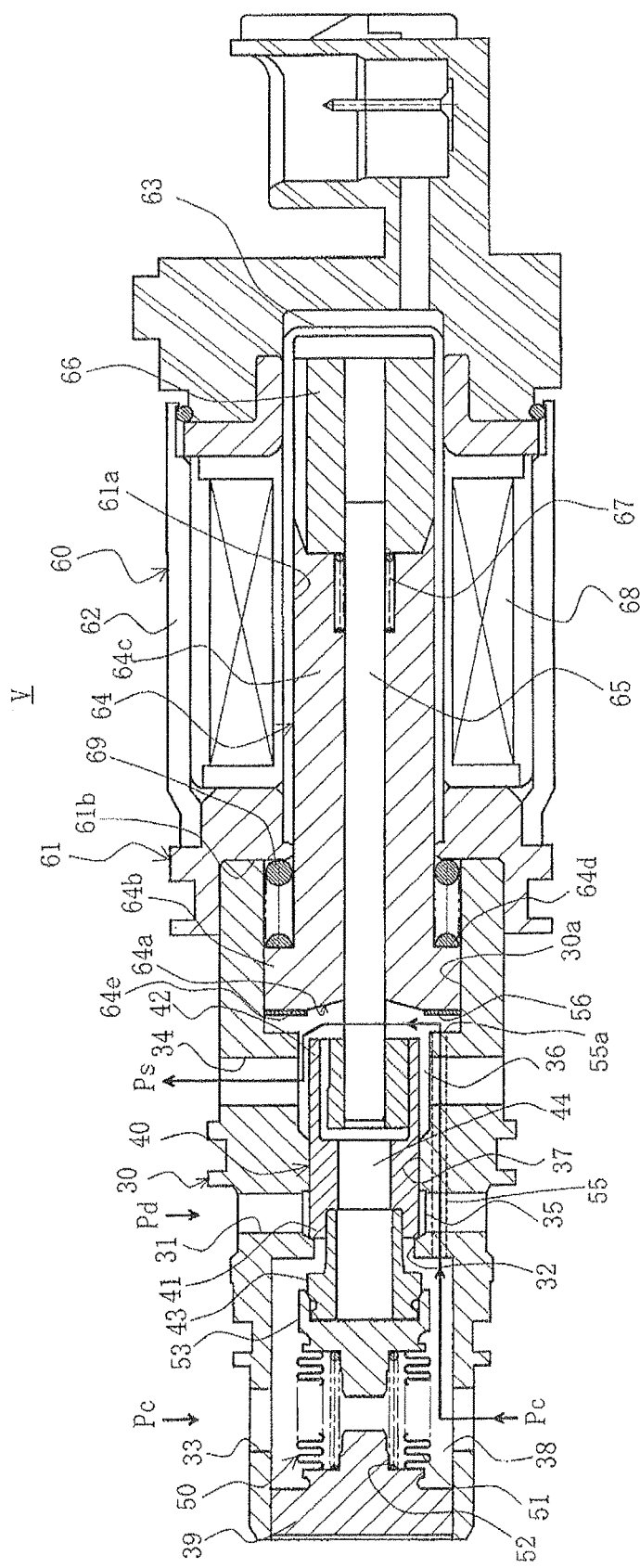

Besides, immediately after start-up, when the control chamber pressure Pc is below the predetermined level, as shown in FIG. 6, the pressure sensitive body 51 is extended, and the third valve portion 43 is seated on the valve seat body 53, so that the communication passages (suction-side passages) 33, 44, 34 are closed, and the liquid refrigerant is not discharged from the communication passages (suction-side passages) 33, 44, 34. However, since the flat outer diameter-side end face 64e of the center post 64 is separated from the open end 55a of the bypass passage 55, the bypass passage 55 is opened, and the liquid refrigerant or the like accumulating in the control chamber 12 is discharged into the suction chamber 13 via the bypass passage 55, as shown by arrows in FIG. 6.

[Description of a State of Performing Continuous Control]

Figure 7:
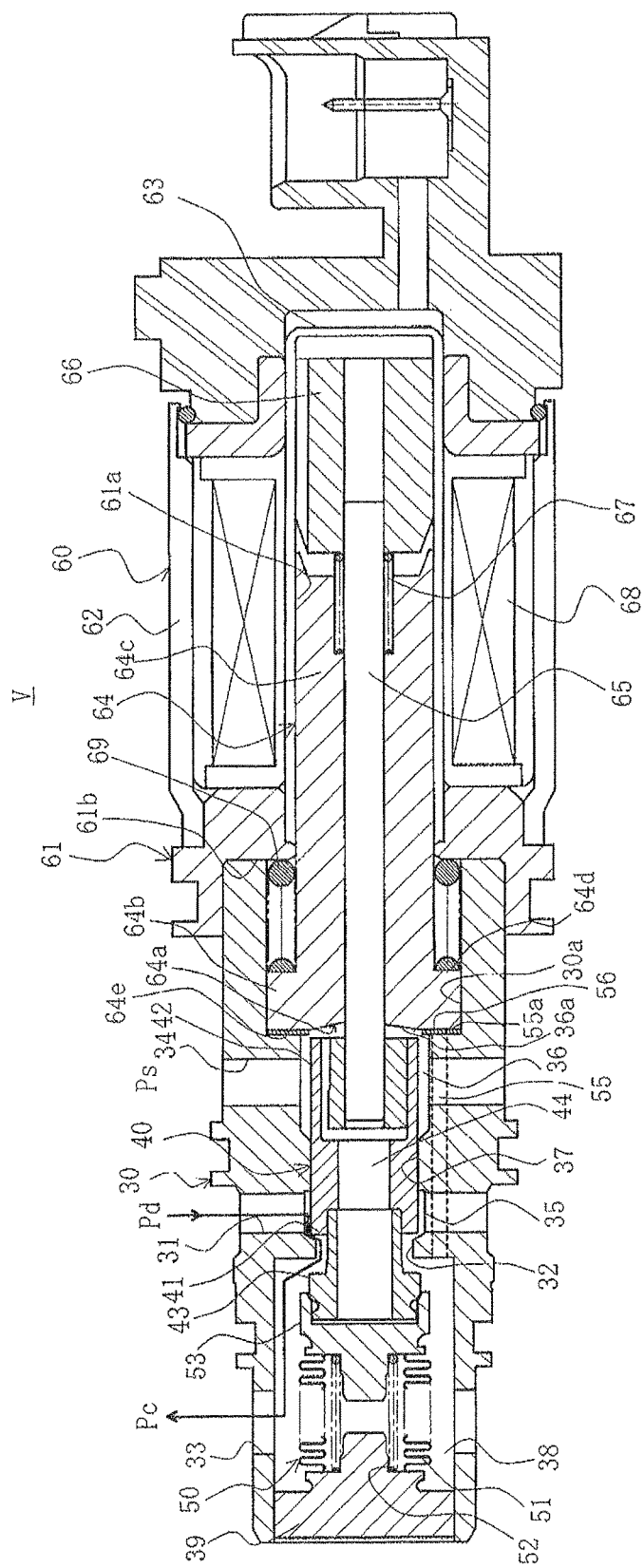

FIG. 7 shows a state of performing continuous control. If the compressor is in a continuous control state, by means of the solenoid 60, the first valve portion 41 is in a small opening degree state and at the same time, the second valve portion 42 also is in a small opening degree state. In addition, the center post 64 is in a state of abutting on the left end of the accommodating hole 30a of the valve body 30 by the urging force of the elastic member 69. Since the control chamber pressure Pc is below the predetermined level when performing continuous control, the pressure sensitive body 51 is extended, and the third valve portion 43 is seated on the valve seat body 53, so that the suction-side passages between the control chamber 12 and the suction chamber 13 are blocked. In addition, the flat outer diameter-side end face 64e of the center post 64 is in a state of abutting on the open end 55a of the bypass passage 55, so that the control chamber 12 and the suction chamber 13 are not in communication with each other.

In this state, a predetermined amount of control fluid flows from the discharge chamber to the control chamber as shown by arrows.

[Description of a State of Performing OFF-Operation]

FIG. 8 shows a state of performing OFF-operation. When the coil 68 is not energized, the valving element 40 is moved to the right side in FIG. 8 by the urging force of the pressure sensitive body 50 and the coil spring 67, the first valve portion 41 is separated from the seat face 35a to open the communication passages (discharge-side passages) 31, 32 and at the same time, the second valve portion 42 is seated on the seat face 36a to close the communication passages (suction-side passages) 34, 44.

In addition, the center post 64 is in a state of abutting on the left end of the accommodating hole 30a of the valve body 30 by the urging force of the elastic member 69.

That is, in this state, the communication passages (discharge-side passages) 31, 32 are opened, and the communication passages (suction-side passages) 34, 44 are closed.

In addition, the flat outer diameter-side end face 64e of the center post 64 is in a state of abutting on the open end 55a of the bypass passage 55, so that the control chamber 12 and the suction chamber 13 are not in communication with each other.

In this state, a high-pressure fluid flows from the discharge chamber to the control chamber as shown by arrows.

As discussed above, according to the capacity control valve of the second embodiment, when discharging the liquid refrigerant, the passage area of the second valve chamber 36 is dramatically increased when the control chamber pressure Pc is above the predetermined level, and in addition to this, the liquid refrigerant or the like is discharged through the bypass passage 55 in parallel with the suction-side passages 44, 34, so that the discharge rate is further increased.

In addition, when discharging the liquid refrigerant, as shown in FIG. 6, the pressure sensitive body 51 is extended and the third valve portion 43 is seated on the valve seat body 53 when the control chamber pressure Pc is below the predetermined level, so that the communication passages (suction-side passages) 33, 44, 34 are closed, and the liquid refrigerant is not discharged from the communication passages (suction-side passages) 33, 44, 34. However, since the flat outer diameter-side end face 64e of the center post 64 is separated from the open end 55a of the bypass passage 55, the bypass passage is opened, and the liquid refrigerant or the like accumulating in the control chamber 12 is discharged into the suction chamber 13 via the bypass passage 55, as shown by arrows in FIG. 6.

In the above, although the embodiments of the present invention have been described with reference to the drawings, specific configurations are not limited to these embodiments, and any modifications and additions which do not depart from the gist of the present invention are to be included in the present invention.

For example, in the above-mentioned embodiments, the suction-side passages are composed of the internal passage consisting of the communication passage 44 passing through from the second valve portion 42 to the third valve portion 43, and/or the bypass passage 55 for providing direct communication between the third valve chamber 38 and the second valve chamber 36, opening and closing of the second valve chamber in the internal passage is performed by the second valve chamber and the center post, and opening and closing of the second valve chamber in the bypass passage 55 is performed by the center post. However, the embodiments are not limited thereto, and in each case, the center post may be included as a constituent member of an opening/closing means.

REFERENCE SIGNS LIST

10 Casing
11 Discharge chamber
12 Control chamber (Crank chamber)
13 Suction chamber
14 Cylinder
15 Communication passage
16 Communication passage
17 Communication passage
18 Communication passage
19 Fixed orifice
20 Rotating shaft
21 Swash plate
22 Piston
23 Coupling member
24 Driven pulley
25 Condenser
26 Expansion valve
27 Evaporator
30 Valve body
31, 32, 33 Communication passages (Discharge-side passages)
33, 34 Communication passages (Suction-side passages)
35 First valve chamber
36 Second valve chamber
36a Seat face
37 Guide passage
38 Third valve chamber
39 Closing member
40 Valving element
41 First valve portion
42 Second valve portion
43 Third valve portion
44 Communication passage
50 Pressure sensitive body
51 Bellows
52 Coil spring
53 Valve seat body
60 Solenoid
61 Solenoid body
62 Casing
63 Sleeve
64 Center post
65 Driving rod
66 Plunger
67 Coil spring
68 Coil for excitation
69 Elastic member
M Swash plate type variable capacity compressor
V Capacity control valve
Pd Discharge chamber pressure
Ps Suction chamber pressure
Pc Control chamber pressure

The invention claimed is:

1. A capacity control valve comprising:
discharge-side passages for providing communication between a discharge chamber for discharging a fluid and a control chamber for controlling a discharge rate of the fluid;
a first valve chamber formed in the middle of the discharge-side passages;
a valving element integrally having a first valve portion for opening and closing the discharge-side passages in the first valve chamber;
suction-side passages for providing communication between a suction chamber for sucking the fluid and the control chamber;
a second valve chamber and a third valve chamber formed in the middle of the suction-side passages;
a suction-side passage opening/closing device provided in the middle of the suction-side passages; and
a solenoid for exerting an electromagnetic driving force for controlling the valving element, and wherein
the suction-side passage opening/closing device has a third valve portion for opening and closing the suction-side passages by receiving the pressure of the control chamber in the third valve chamber, and a second valve portion for opening and closing the suction-side passages by receiving the electromagnetic driving force in the second valve chamber, and
a center post which is a constituent member of the solenoid is provided movably in the axial direction in such a manner that one end face thereof is opposed to the second valve portion, and the center post is driven to the direction away from the second valve portion and controlled so that the distance between the second valve portion is increased when discharging a liquid refrigerant.

2. The capacity control valve according to claim 1, wherein
the end face opposed to the second valve portion of the center post functions as a valve seat face of the second valve portion.

3. The capacity control valve according to claim 2, wherein
the end face opposed to the second valve portion of the center post is formed in a tapered shape.

4. The capacity control valve according to claim 2, wherein
the solenoid is provided with an elastic member for urging the center post to the second valve portion side, and the urging force of the elastic member is set smaller than the electromagnetic driving force to the center post when discharging the liquid refrigerant and larger than the electromagnetic driving force to the center post when performing continuous variable control.

5. The capacity control valve according to claim 2, wherein
the suction-side passages are composed of an internal passage passing through the inside of the third valve portion, first valve portion, and second valve portion.

6. The capacity control valve according to claim 2, wherein
a bypass passage for providing direct communication between the third valve chamber and the second valve chamber is provided in the valve body in addition to the internal passage, and the bypass passage is configured so as to be opened in accordance with the movement of the center post when discharging the liquid refrigerant.

7. The capacity control valve according to claim 6, wherein
the end face opposed to the bypass passage of the center post is formed in a flat shape, and an elastic member for sealing is provided on the flat portion.

8. The capacity control valve according to claim 1, wherein
the end face opposed to the second valve portion of the center post is formed in a tapered shape.

9. The capacity control valve according to claim 8, wherein
the solenoid is provided with an elastic member for urging the center post to the second valve portion side, and the urging force of the elastic member is set smaller than the electromagnetic driving force to the center post when discharging the liquid refrigerant and larger than the electromagnetic driving force to the center post when performing continuous variable control.

10. The capacity control valve according to claim 8, wherein
the suction-side passages are composed of an internal passage passing through the inside of the third valve portion, first valve portion, and second valve portion.

11. The capacity control valve according to claim 8, wherein
a bypass passage for providing direct communication between the third valve chamber and the second valve chamber is provided in the valve body in addition to the internal passage, and the bypass passage is configured so as to be opened in accordance with the movement of the center post when discharging the liquid refrigerant.

12. The capacity control valve according to claim 11, wherein
the end face opposed to the bypass passage of the center post is formed in a flat shape, and an elastic member for sealing is provided on the flat portion.

13. The capacity control valve according to claim 1, wherein
the solenoid is provided with an elastic member for urging the center post to the second valve portion side, and the urging force of the elastic member is set smaller than the electromagnetic driving force to the center post when discharging the liquid refrigerant and larger than the electromagnetic driving force to the center post when performing continuous variable control.

14. The capacity control valve according to claim 13, wherein
the suction-side passages are composed of an internal passage passing through the inside of the third valve portion, first valve portion, and second valve portion.

15. The capacity control valve according to claim 13, wherein
a bypass passage for providing direct communication between the third valve chamber and the second valve chamber is provided in the valve body in addition to the internal passage, and the bypass passage is configured so as to be opened in accordance with the movement of the center post when discharging the liquid refrigerant.

16. The capacity control valve according to claim 15, wherein
the end face opposed to the bypass passage of the center post is formed in a flat shape, and an elastic member for sealing is provided on the flat portion.

17. The capacity control valve according to claim 1, wherein
the suction-side passages are composed of an internal passage passing through the inside of the third valve portion, first valve portion, and second valve portion.

18. The capacity control valve according to claim 17, wherein
a bypass passage for providing direct communication between the third valve chamber and the second valve chamber is provided in the valve body in addition to the internal passage, and the bypass passage is configured so as to be opened in accordance with the movement of the center post when discharging the liquid refrigerant.

19. The capacity control valve according to claim 1, wherein
a bypass passage for providing direct communication between the third valve chamber and the second valve chamber is provided in the valve body in addition to the internal passage, and the bypass passage is configured so as to be opened in accordance with the movement of the center post when discharging the liquid refrigerant.

20. The capacity control valve according to claim 19, wherein
the end face opposed to the bypass passage of the center post is formed in a flat shape, and an elastic member for sealing is provided on the flat portion.

* * * * *